(12) United States Patent
Gleason

(10) Patent No.: US 9,783,379 B2
(45) Date of Patent: Oct. 10, 2017

(54) MULTI-SEAL DOCK SEAL

(71) Applicant: Denis Gleason, Bowmanville (CA)

(72) Inventor: Denis Gleason, Bowmanville (CA)

(73) Assignee: Nordock, Inc., Bowmanville, Ontario (CA)

( * ) Notice: Subject to any disclaimer, the term of this patent is extended or adjusted under 35 U.S.C. 154(b) by 0 days.

(21) Appl. No.: 15/079,021

(22) Filed: Mar. 23, 2016

(65) Prior Publication Data

US 2016/0280478 A1 Sep. 29, 2016

Related U.S. Application Data

(60) Provisional application No. 62/137,152, filed on Mar. 23, 2015.

(51) Int. Cl.
*B65G 69/00* (2006.01)
*E04F 19/02* (2006.01)
*B65G 69/32* (2006.01)

(52) U.S. Cl.
CPC .......... *B65G 69/008* (2013.01); *E04F 19/026* (2013.01)

(58) Field of Classification Search
CPC .... B65G 69/008; B65G 69/001; E04F 19/026
See application file for complete search history.

(56) References Cited

U.S. PATENT DOCUMENTS

| | | |
|---|---|---|
| 3,230,675 A | 1/1966 | Frommelt et al. |
| 3,403,489 A | 10/1968 | Frommelt et. al. |
| 3,714,745 A | 2/1973 | O'Neal |
| 3,826,049 A | 7/1974 | Frommelt et al. |
| 3,939,614 A | 2/1976 | Frommelt et al. |
| 4,020,607 A | 5/1977 | Bjervig |
| 4,213,279 A | 7/1980 | Layne |
| 4,328,273 A * | 5/1982 | Yackiw .................. E06B 7/231 156/244.11 |
| 4,365,452 A | 12/1982 | Fillman et al. |
| 4,638,612 A * | 1/1987 | Bennett ................ B65G 69/008 14/71.5 |
| 4,679,364 A | 7/1987 | Fettig et al. |
| 4,711,059 A * | 12/1987 | Layne .................. B65G 69/008 14/71.5 |
| 4,805,362 A * | 2/1989 | Frommelt ............ B65G 69/008 52/173.2 |
| 5,048,246 A * | 9/1991 | Sullivan ............... B65G 69/008 52/173.2 |
| 5,109,639 A | 5/1992 | Moore |

(Continued)

*Primary Examiner* — Rodney Mintz
(74) *Attorney, Agent, or Firm* — Jeffrey S. Sokol

(57) ABSTRACT

The present multi-seal dock seal has a pair of side seal assemblies that form both a compression seal and a wipe seal with a trailer. The side seal assembly secure to the building wall along the door opening. A wipe seal pad is positioned in front of a compression pad by an extension pad. The flexible pads are formed of polyurethane foam wrapped with a PVC vinyl coated polyester cover. The wipe and extension pads are more rigid than the compression pads, and the compression and extension pads are joined together to further support the extension pad. The side seal assemblies provide sealing zones to accommodate a wide range of truck and trailer types. The multiple seals formed by the multi-seal dock seal ensure a good seal with the trailer when the trailer fully backs into the bay, and when an obstruction prevents it from fully backing into the bay.

21 Claims, 15 Drawing Sheets

(56) References Cited

U.S. PATENT DOCUMENTS

| | | | | |
|---|---|---|---|---|
| 5,282,342 A | * | 2/1994 | Brockman | B65G 69/008 52/173.2 |
| 5,622,016 A | * | 4/1997 | Frommelt | B65G 69/008 52/11 |
| 6,073,402 A | | 6/2000 | Moody | |
| 6,170,205 B1 | | 1/2001 | Styba | |
| 6,948,285 B2 | * | 9/2005 | Miller | B65G 69/008 16/277 |
| 6,951,084 B2 | * | 10/2005 | Borgerding | B65G 69/008 49/504 |
| 7,757,442 B2 | * | 7/2010 | Hoffmann | B65G 69/008 52/173.2 |
| 8,915,029 B2 | * | 12/2014 | Digmann | B65G 69/008 52/173.2 |
| 9,187,271 B2 | * | 11/2015 | Digmann | B65G 69/008 |
| 9,273,512 B2 | * | 3/2016 | Digmann | E06B 7/2303 |
| 2003/0145535 A1 | * | 8/2003 | DiBiase | B65G 69/003 52/173.2 |
| 2004/0020141 A1 | * | 2/2004 | Borgerding | B65G 69/008 52/173.2 |
| 2005/0102929 A1 | * | 5/2005 | Hoffmann | B65G 69/008 52/173.2 |
| 2006/0026912 A1 | * | 2/2006 | Eungard | B65G 69/008 52/173.2 |
| 2006/0032159 A1 | * | 2/2006 | Eungard | B65G 69/008 52/173.2 |
| 2006/0090407 A1 | * | 5/2006 | Hoffmann | B65G 69/008 52/173.2 |
| 2013/0221624 A1 | * | 8/2013 | Digmann | B65G 69/008 277/650 |

* cited by examiner

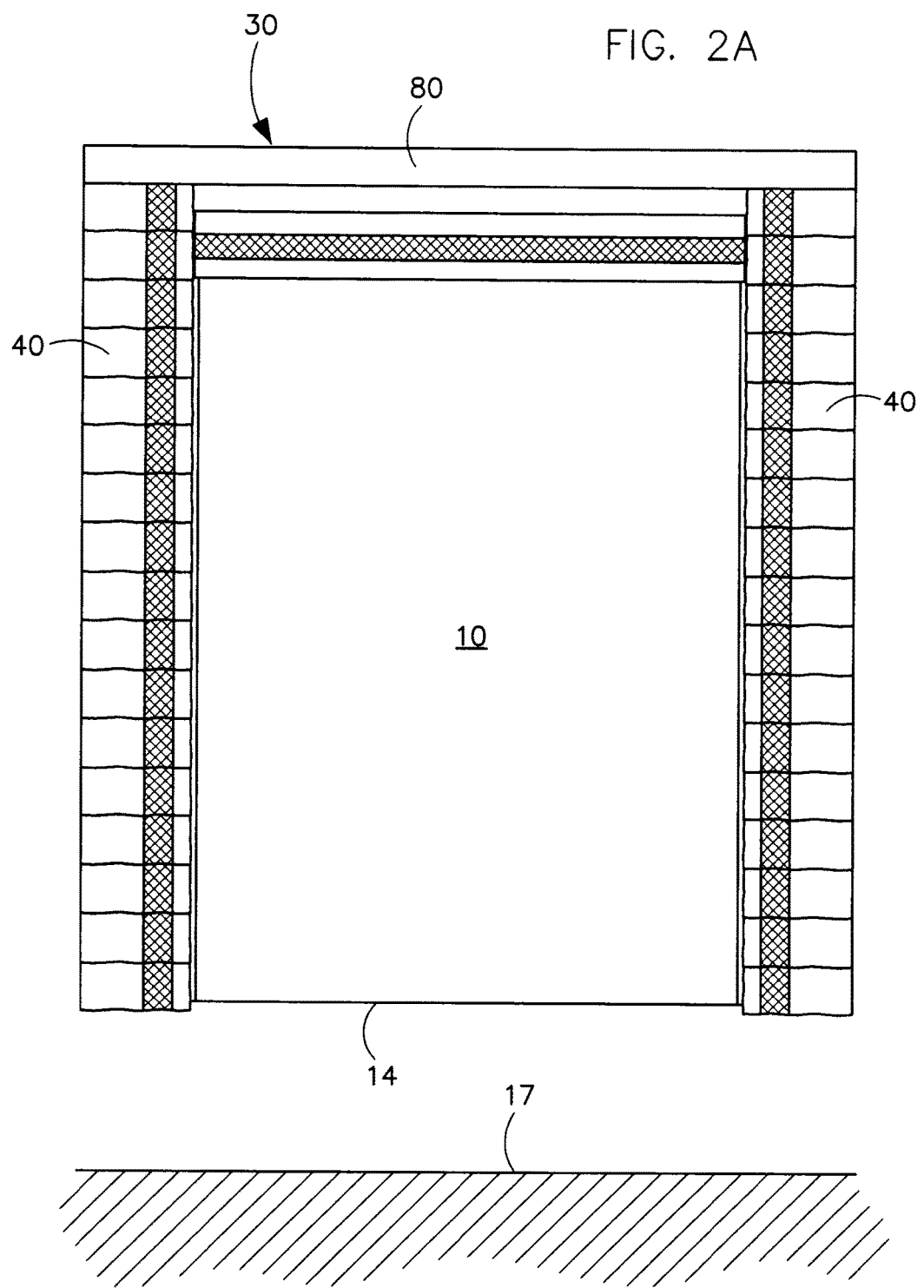

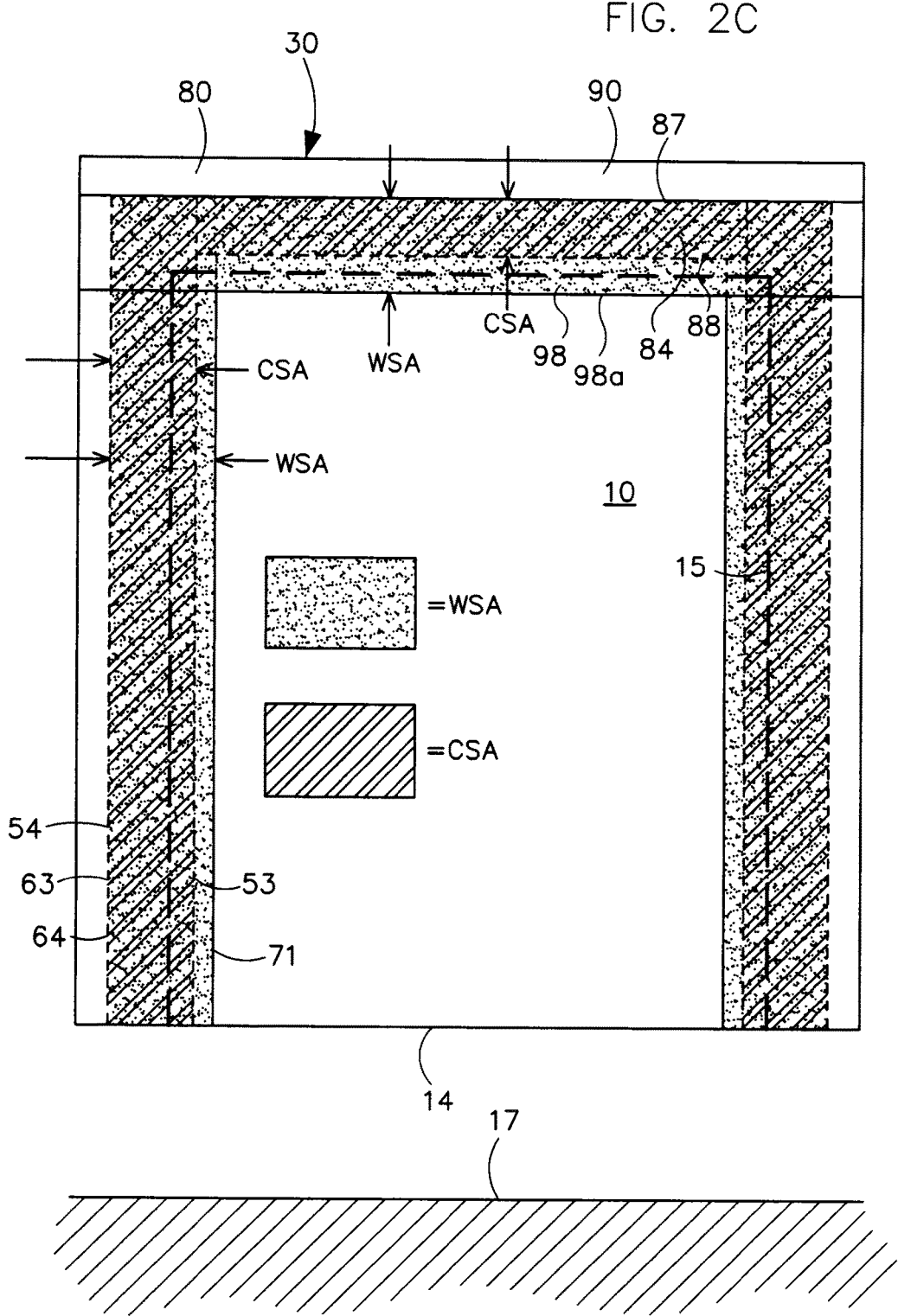

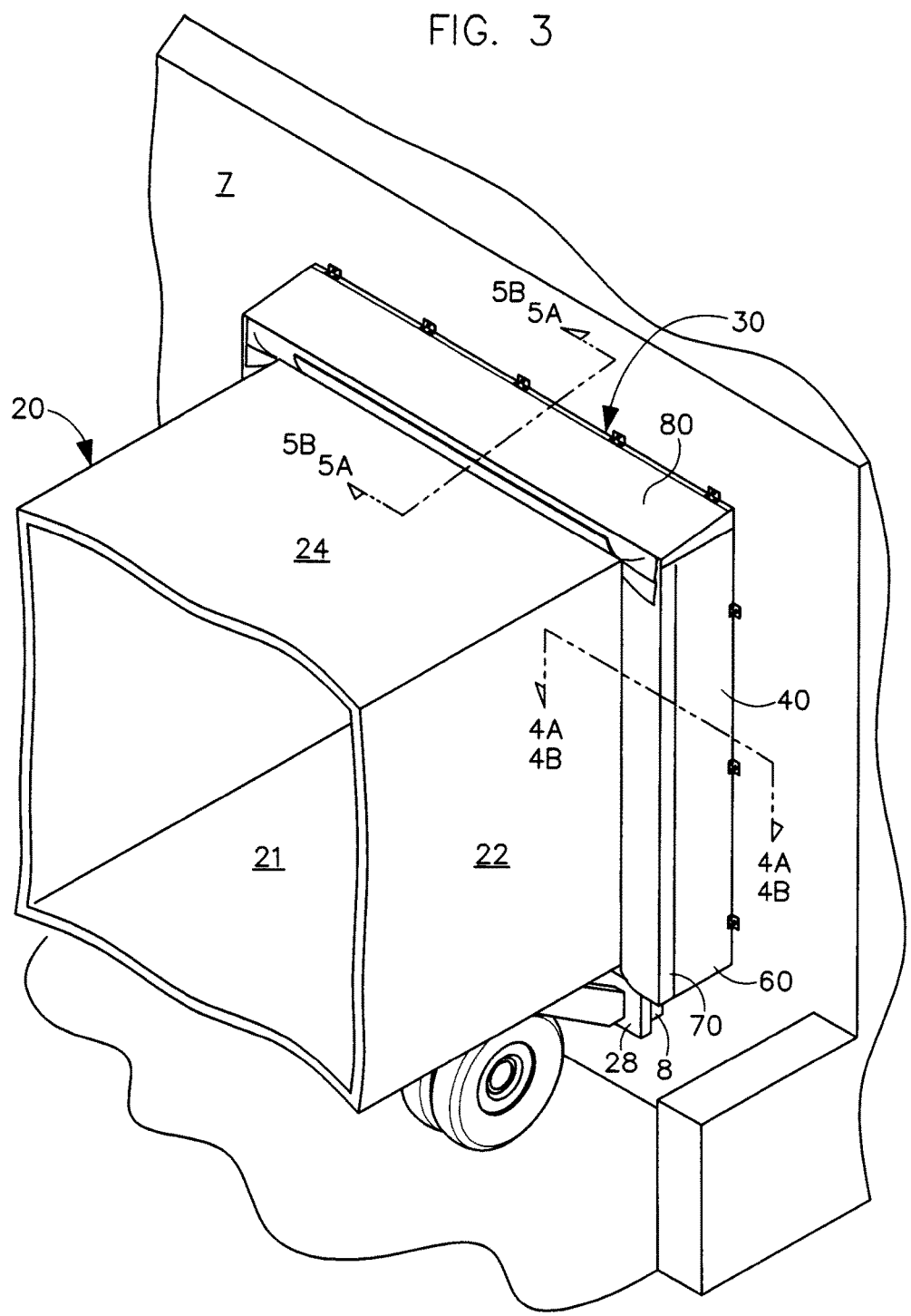

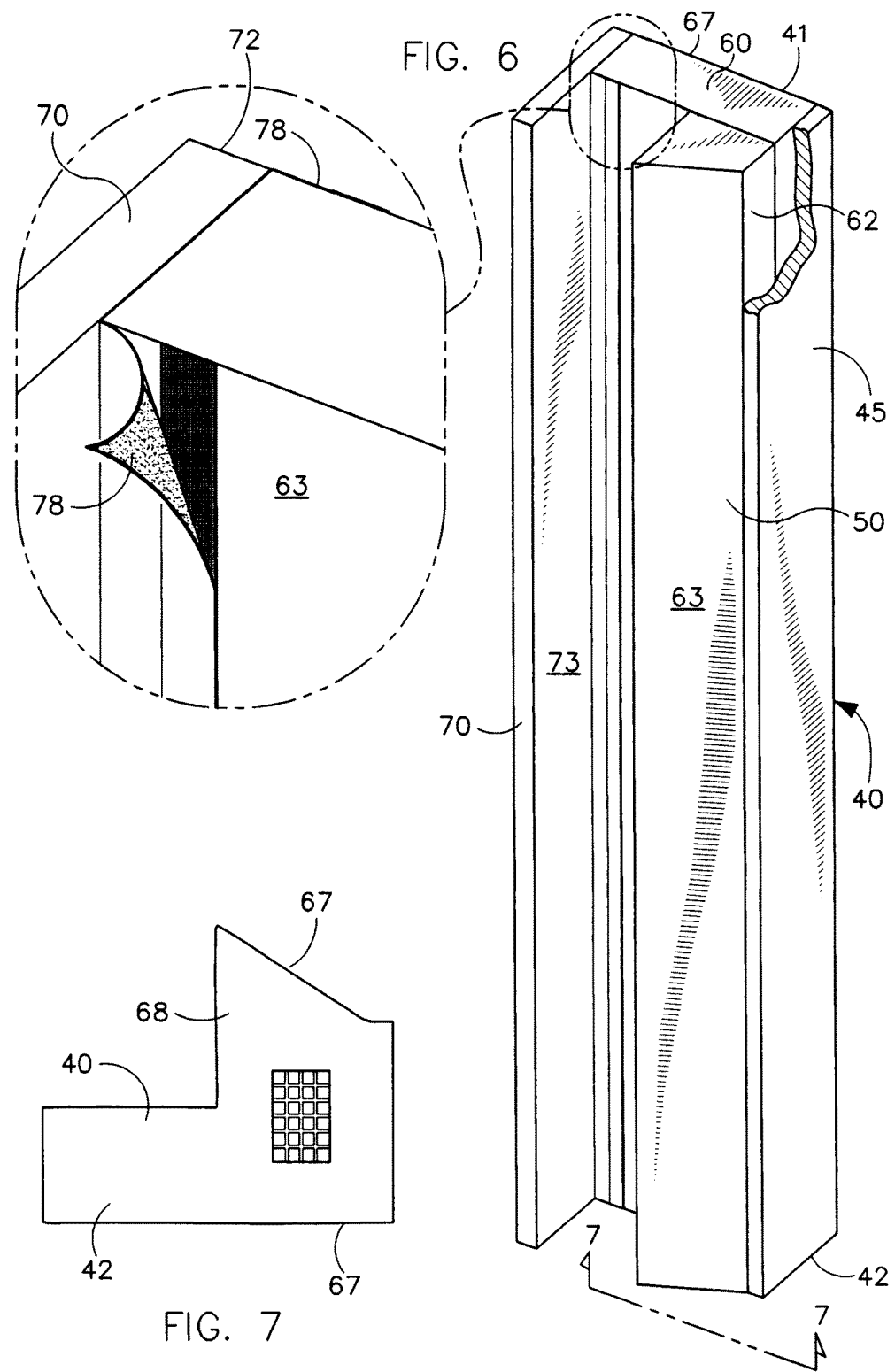

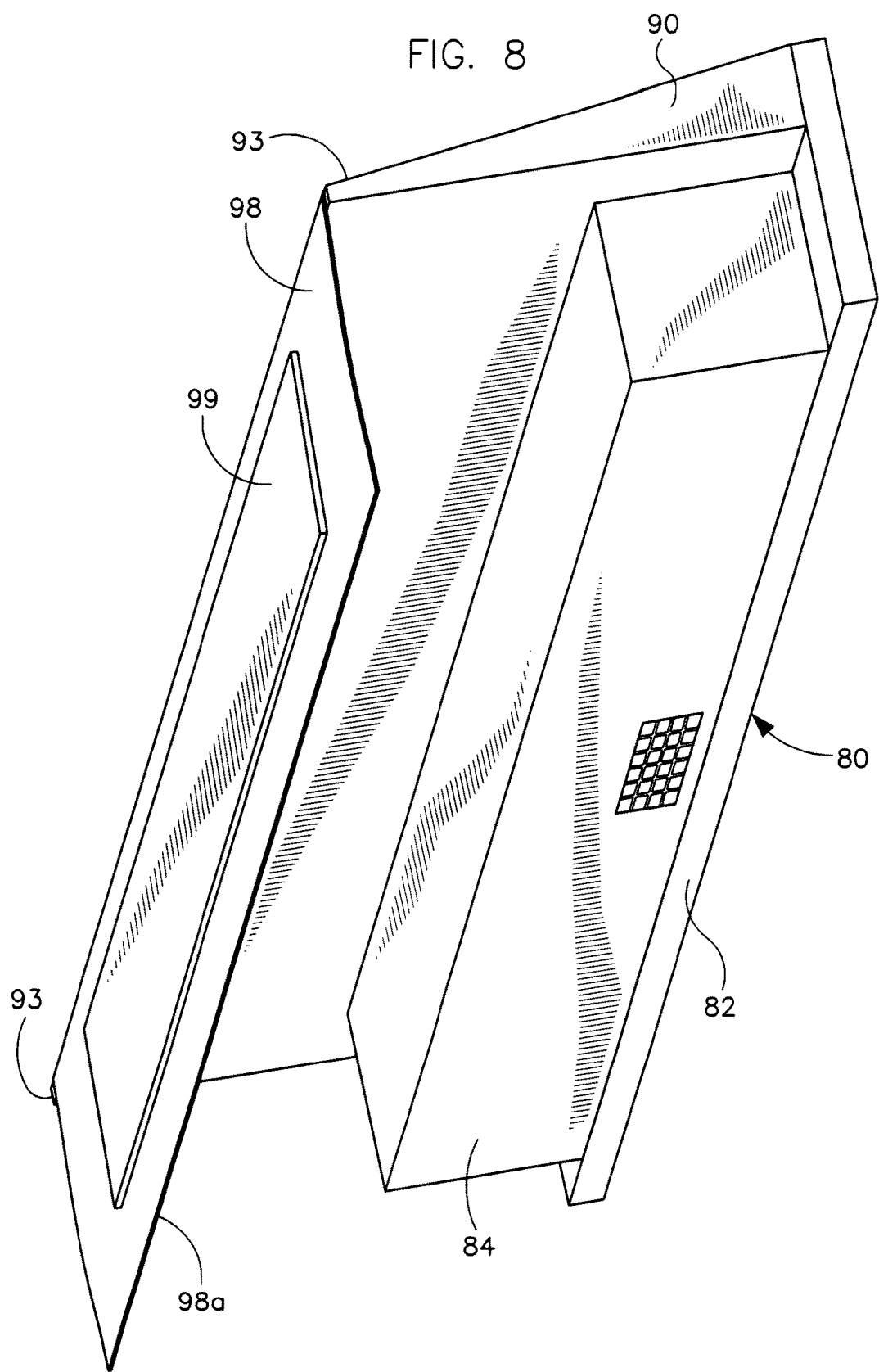

MULTI-SEAL DOCK SEAL

TECHNICAL FIELD OF THE INVENTION

This invention relates to a dock seal for a loading dock that forms multiple weather seals along the side walls and around the roof of a trailer when the trailer is parked in the loading dock trailer bay.

BACKGROUND OF THE INVENTION

Dock seals form a weather seal between a trailer and a loading bay. Various types of dock seals have been developed and are know in the industry. Inflatable seals that engage the sides and top of a trailer are described in U.S. Pat. Nos. 3,714,745, 3,939,614 and 5,109,639 to O'Neal, Frommelt and Moore, respectively. A portable inflating seal that engages the rear end of a trailer is disclosed in U.S. Pat. No. 6,073,402 to Moody. An expanding seal engaging the sides and top of a trailer is disclosed in U.S. Pat. No. 4,020,607 to Bjervig. A compression seal that seal against the rear end of the trailer is disclosed in U.S. Pat. No. 6,170,205 to Styba. A compressible deflecting seal that engages the side and top of a trailer is disclosed in U.S. Pat. No. 4,679,364 to Fettig. A compressible L-shaped seal that engages the sides and top of a trailer is disclosed in U.S. Pat. No. 4,213,279 to Layne. Various problems exist with each of these dock seals. For example, conventional compression seals are impractical for large variations of trucks and trailers especially those with rear steps or tail gates. Conventional wiping seals and shelters do not provide as good of seal efficiency of a compression seal. A problem with conventional dock shelters is that they include rigid materials that are prone to damage by the trailers when backing into the loading bay. The present invention is intended to resolve these and other problems.

BRIEF DESCRIPTION OF THE INVENTION

The present invention pertains to a multi seal dock seal for a loading dock. The multi-seal dock seal has a pair of side seal assemblies that include a compression seal pad and a wipe seal pad. The side seal assemblies are secured along the sides of the door opening and extend at least the height of the opening. A wipe seal extension pad abuts the compression seal and positions the wipe seal from the front surface of the compression pad. The pads are formed of polyurethane foam wrapped with a PVC vinyl coated polyester cover. The foam forming the wipe seal and extension pads is more rigid than the foam forming the compression seal pads. The compression seal and extension pads are wrapped by a single vinyl cover to form a unitary structure and provide support to the extension pad. The side seal assemblies provide sealing zones along the sides of the trailer to accommodate a wide range of trailer widths, and to accommodate trailers that are not exactly centered with the dock door opening.

An advantage of the multi-seal dock seal is that it accommodates a full range of truck types. The multi-seal dock seal provides both a compression seal and a wipe seal to seal the truck or trailer and prevent rain, wind and humidity, as well as insects and debris from blowing into or otherwise entering the interior of the building when the loading bay door is open to load and unload goods from the trailer. These two seals provide the efficiency of a compression seal and the wiping action of a perimeter seal to cover the full range of truck types. The multiple seals formed by the multi-seal ensure a good seal between the trailer and the loading bay both when the trailer is able to fully back into the bay, and when the trailer has an obstruction such as a step platform that prevents it from fully backing into the bay. Even in this later situation, the multi-seal dock seal keeps the outside air, rain, humidity, dust and bugs from entering the loading bay to provide a safe and comfortable environment inside the loading dock building and avoid heating and cooling losses.

Another advantage of the multi-seal dock seal is that when desired, it is provided with a custom fit top seal assembly. The top seal assembly can include a canopy pad and curtain flap, as well as a top compression seal. The top and side seal assemblies join together to provide continuous seal around the top and sides of the trailer.

A further advantage of the multi-seal dock seal is its ability to hold up to wind loads. A mounting plate rigidly secures the integrated compression and wipe extension pad structure to the building wall. The compression seal abuts and supports the side of the wipe seal extension pad. These compression and wipe pads are glued together and wrapped together by a single vinyl cover. The wipe seal extension pads and wipe seal pads are formed of a more rigid polyurethane foam material to provide further support to the wipe seals. Securement strips are also located on the top and bottom ends of the side seal assemblies to provide additional support to the wipe seals. The wipe seals are free to flex inwardly to engage the sides of a trailer, but are supported by the rigid mounting plate, abutting engagement with the compression seals, the added rigidity of the extension pads and the securement strip to prevent the wind from blowing the wipe seals outwardly or dislodging them from the side seal assemblies.

A still further advantage of the multi-seal dock seal is that its wipe seal does not become pinched against the compression seal during use. The thickness of the compression seal, the outward length of the wipe seal extension and the inward length of the wipe seal are sized to prevent the wipe seal from engaging and being pinched against the front surface of the compression seal pad when a trailer pushes against and bends the wipe seal back. This non-binding structure prevents damage to the multi-seal. The wipe seal pad does not engage the compression seal when the multi-seal dock seal forms either a single wipe seal when the trailer is prevented from fully entering the dock bay, or a multi-seal when the trailer fully enters the dock bay.

A still further advantage of the multi-seal dock seal is that the length of the wipe seal pads and the width of the compression pads are adjustable. For example, the length of the wipe seal pad can be adjusted to extend into the door opening projection more than the compression seal pad extends into the opening projection. Thus, the side seal assemblies can adjust the width of the compression seal pads and length of the wipe seal pads to adjust the engagement areas or zones (CSA and WSA) to meet the needs of a particular loading dock facility or even a particular loading bay.

A still further advantage of the multi-seal dock seal is that it is constructed of flexible components. Other than their mounting plate secured flush against the building wall, each side seal assembly is constructed of flexible components or pads that extend or are positioned outwardly from the building. Similarly, the top seal assembly is constructed of flexible components, that extend or are positioned outwardly from the building. A truck or trailer that is not properly centered or aligned with the multi-seal dock seal sealing zones (CSA and WSA) when it backs into the loading bay will contact flexible structures to help avoid damage to the truck or trailer as well as the multi-seal dock seal structure itself.

A still further advantage of the multi-seal dock seal is that its side seal assemblies are compatible with a rigid header, canopy or head frame structure. The side seal assemblies easily fit under these structures. Their curtains overlap the side seal assemblies to provide continuous seal around the top and sides of the trailer.

Other aspects and advantages of the invention will become apparent upon making reference to the specification, claims and drawings.

BRIEF DESCRIPTION OF THE DRAWINGS

FIG. 2A is a front view of the multi-seal dock seal installed around the top and sides of a loading bay door opening with alignment strips to visually guide a trailer into the bay and wear flaps to provide extra protection from engagement with the trailer.

FIG. 2C is a front view of the multi-seal dock seal installed around the loading bay door opening with dashed lines showing the door opening of the building, and showing side wipe seal engagement area or zone (WSA) projecting into the door opening a greater distance than the side compression seal engagement area or zone (CSA).

FIG. 3 is a perspective view of the multi-seal dock seal installed around the loading bay door opening with a trailer backed into the bay and sealingly engaging the multi-seal to form a continuous weather seal around the sides and top of the trailer.

FIG. 6 is a perspective view of the side seal assembly of the multi-seal, with a detail showing a Velcro strip securing the side wipe pad to the forward extending pad.

FIG. 7 is a bottom view of the side seal assembly showing a vent on its lower surface.

FIG. 8 is a perspective view of the top seal assembly of the multi-seal.

DESCRIPTION OF THE PREFERRED EMBODIMENTS

While this invention is susceptible of embodiments in many different forms, the drawings show and the specification describes several embodiments of the invention. It should be understood that the drawings and specification are to be considered an exemplification of the principles of the invention. They are not intended to limit the broad aspects of the invention to the embodiments illustrated.

Figure 1A:
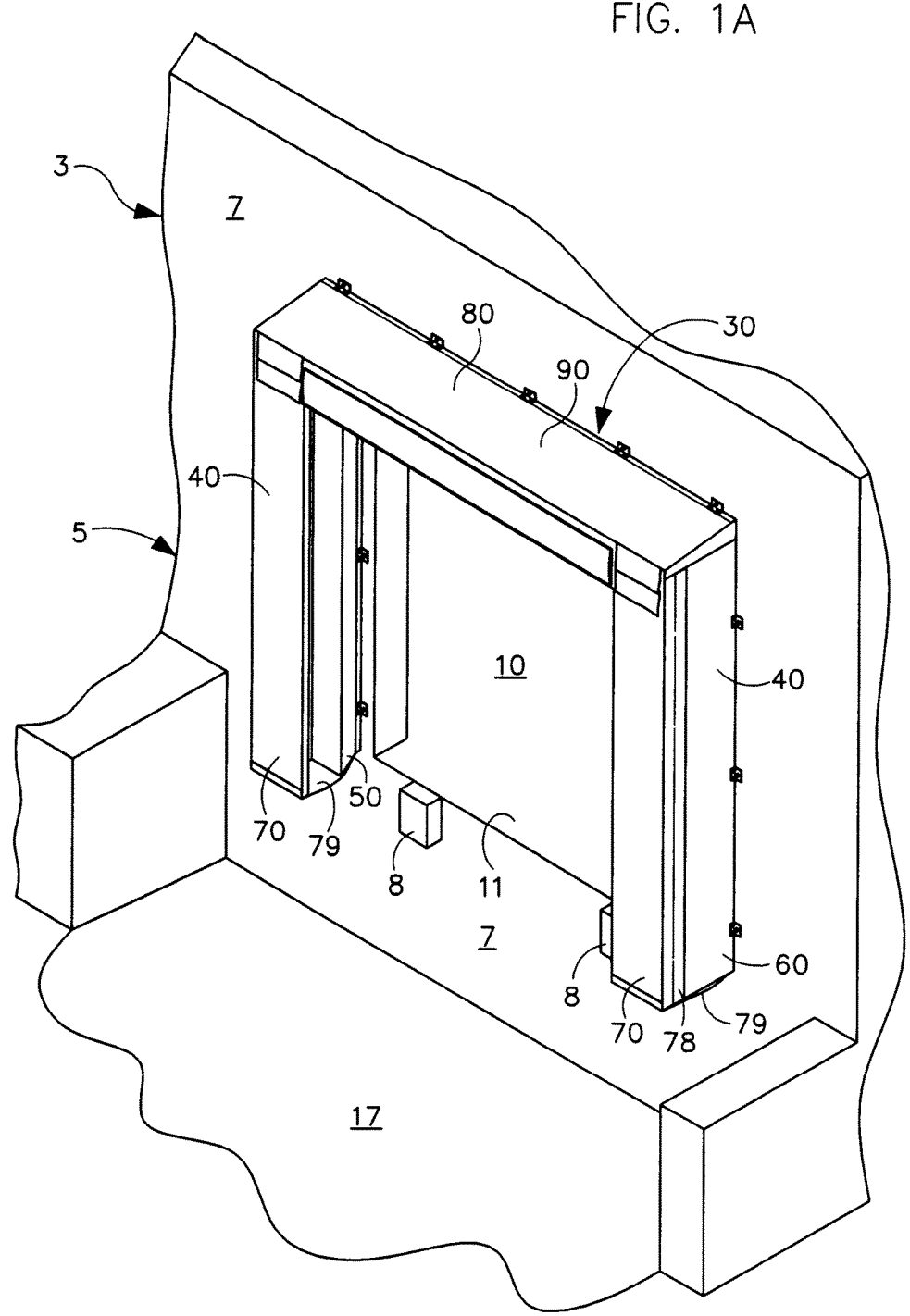
FIG. 1A is a perspective view of the multi-seal dock seal installed around the loading bay door opening of a loading dock building.
Figure 1B:
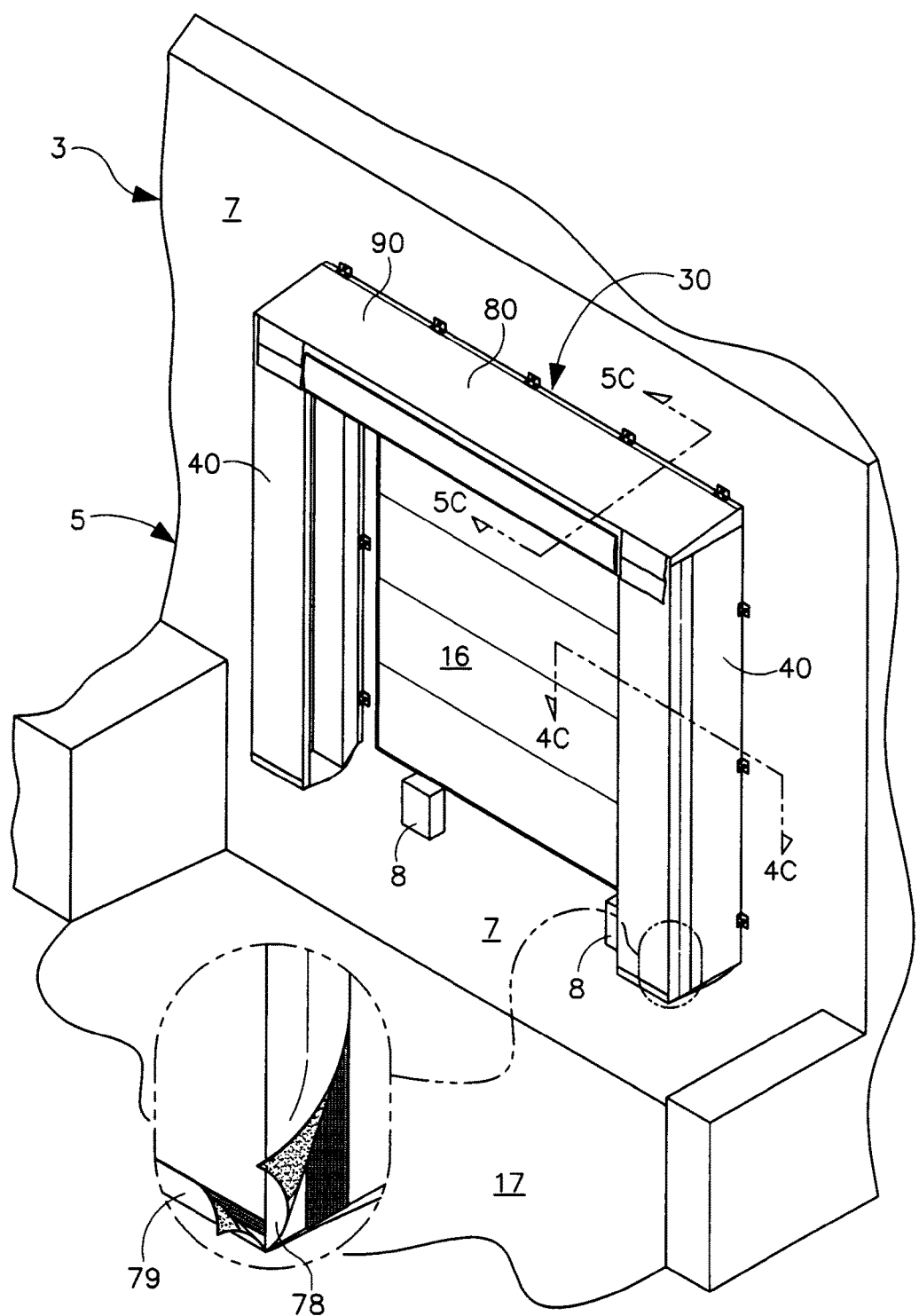
FIG. 1B is a perspective view of a second embodiment of the multi-seal dock seal installed around the loading bay door opening of a loading dock building, and with a detail showing a Velcro strip securing the side wipe pad to the forward extending pad and a Velcro strip securing a side stabilizing strip to the bottom of the side wipe pad.
Figure 2B:
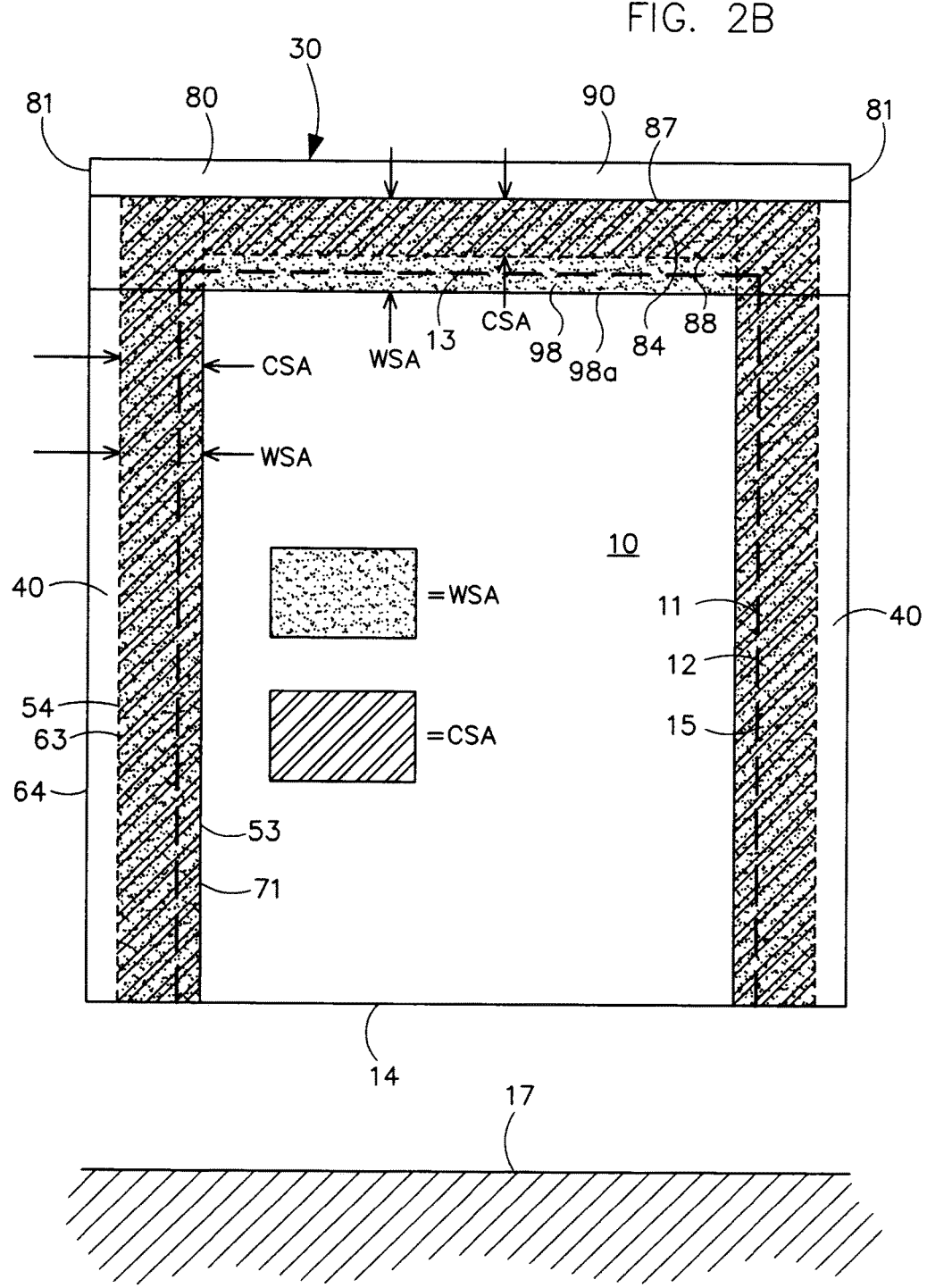
FIG. 2B is a front view of the multi-seal dock seal installed around the loading bay door opening with dashed lines showing the door opening of the dock bay, and showing the compression seal and wipe seal engagement areas or zones with the side compression seal engagement area or zone (CSA) and side wipe seal engagement area or zone (WSA) projecting into the door opening the same distance.
Figure 9:
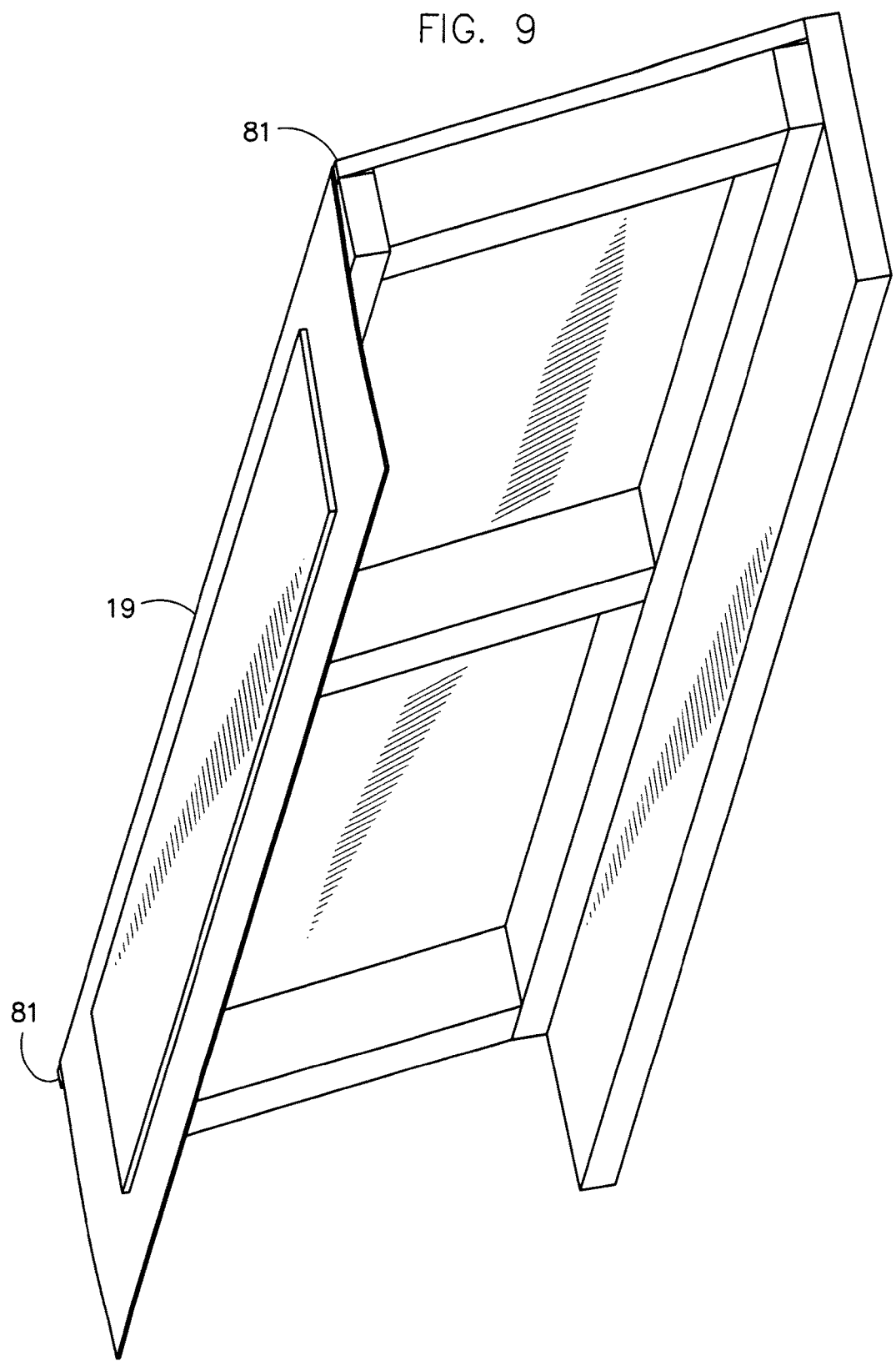
FIG. 9 is a perspective view showing a conventional header with a wooden support frame and front curtain.

The present invention pertains to a multi-seal dock seal for a building 3 with a loading dock bay 5. As shown in FIGS. 1A and 1B, the outer wall 7 of the building 3 forms the perimeter of a bay opening 10. Bumpers 8 are typically located on the outside wall 7. The door opening 10 has a perimeter 11 formed by its vertical side edges 12, horizontal top edge 13 and the floor 14 of the building. The door opening perimeter 11 forms a door opening projection 15 that extends outwardly into the loading bay 5 as best shown in FIGS. 2B and 2C. The opening 10 includes a door 16 that is opened to load and unload goods, and closed to seal the interior of the building from the weather. The bumpers 8 are below the door opening 10 and floor 14 of the building 3 and above the ground or approach 17 leading into the loading bay 5. A conventional trailer 20 backs into the loading bay 5 to load or unload goods. The trailer 20 has a floor 21, opposed side walls 22 and a roof 24 that form an opening 25 at its rear end 27. The rear end 27 of the trailer 20 has a tailgate or ICC bar 28 that engages the bumpers 8 when the trailer has fully entered the loading bay as shown in FIG. 3. The loading bay can include a conventional rigid header frame and curtain structure 19 as shown in FIG. 9.

The multi-seal seal dock seal is generally referred to by reference number 30 in FIGS. 1-8. The multi-seal 30 provides both a wipe seal 100 and a compression seal 105 with the truck or trailer 20, and integrates these two distinctly different types of trailer seals 100 and 105 into one distinct integrated multi-seal design to provide both the wiping action of a perimeter wipe seal 100 and the efficiency of a compression seal 105 to cover the full range of truck types. The different and multiple seals 110 formed by the multi-seal dock seal 30 ensure a good seal between the trailer 20 and the loading bay 5 when the trailer 20 is able to fully back into the dock 5 as in FIGS. 3, 4A. Even when the trailer is unable to fully back into the dock, such as when a step platform 29 prevents the rear end of the trailer from engaging the loading dock bay bumpers 8, the multi-seal dock seal 30 forms a continuous single seal or wipe seal 100 to ensure an adequate seal between the trailer 20 and the loading bay 5 as shown in FIGS. 4B and 5B. Even in this single-seal situation, the multi-seal dock seal 30 keeps the outside air, rain, humidity, dust and bugs from entering the loading bay to provide a safe and comfortable environment in the loading bay building 3 and avoid heating and cooling losses.

The multi-seal dock seal 30 is formed by a pair of side seal assemblies 40. The multi-seal dock seal 30 can include a cooperating custom fit top seal assembly 80 as shown in FIGS. 1A-B, 3 and 5A-C, or the conventional rigid header frame and curtain 19 as shown in FIG. 9. Each side seal assembly or member 40 has top and bottom ends 41 and 42, and extends vertically along the full height of the vertical side 12 of the dock door opening 10. The conventional rigid header frame and curtain 19 or top seal assembly 80 has side ends 81, and extends the full width of the horizontal top 13 of the opening 10.

As shown in FIGS. 4A-C and 6, each side seal assembly 40 has a ridged backing plate 45 and three compression type foam pads 50, 60 and 70. The backing plate or member 45 is bolted or otherwise rigidly secured to the outer wall 7 of the building 3 as shown in FIGS. 1A-B. This plate 45 spans the height 12 of the loading bay opening 10, and is about two inches thick and ten inches wide. The plate 45 is preferably made of wood, steal or rigid plastic, and is robustly designed to prevent warping, cracking or other deformation during use. Each backing plate 45 is installed with its inside edge offset a uniform distance of about two inches from the side edge 12 of the bay opening 10.

The first flexible component or compression pad 50 spans the height 12 of the bay opening 10, and is glued or otherwise firmly secured to the backing plate 45 along that entire distance. The pad 50 and has a non-compressed, trapezoidal, cross-sectional shape as best show in FIGS. 4B-C and 6. The front and rear surfaces 51 and 52 of the pad 50 define its non-compressed thickness of about ten inches extending away from the building wall 7. The side surfaces 53 and 54 of the pad 50 define its width. The width along its rear or fixed base surface 52 is about three inches. This width increases to about nine inches along its compressible front or outer trailer engaging surface 51. The front surface 51 of each trapezoidal shaped compression pad 50 extends into the bay opening about four inches. The pad 50 has an interior 55 that is formed by a compression type foam, and is preferably an open cell polyurethane foam with a density of about 1.2 pounds per cubic foot and an ILD of about 28-36 lbs/50 sq·in, a tensile strength of about 12 lbs/foot, a tear strength of about 1.2 lbs/in., and memory to resiliently return to its original shape when the trailer 20 pulls away and the foam is not compressed.

The second flexible component or forward extension pad 60 spans the height 12 of the bay opening 10, and is also glued or otherwise firmly secured to the backing plate 45 along that distance. The pad 60 has a rectangular cross-sectional shape as best shown in FIGS. 4A-C and 6. The length of the extension pad 60 is defined by its front and rear surfaces 61 and 62. The pad length extends a distance of about two feet from the building wall 7. The side surfaces 53 and 54 define the width of the extension pad 60. This uniform width is about seven inches. The extension pad 60 has an interior 65 that is formed by a compression type foam, and is preferably an open cell polyurethane foam with a density of about 2 lbs/cubic foot, an ILD of about 90-110 lbs/50 sq·in, a tensile strength of about 12 lbs/foot, a tear strength of about 1.2 lbs/in., and memory to resiliently return to its original shape when the trailer 20 pulls away and the foam is not compressed or flexed.

The extension pad 60 is positioned in abutting engagement with and radially outward from the compression seal 50 relative to the door opening 10. The inner side 63 of the extension pad 60 is flushly engages the outside surface 53 of the compression pad 60, and the pads 50 and 60 are glued together to provide additional lateral strength and stability to the extension pad 60. The compression and extension pads 50 and 60 are also wrapped in a single durable vinyl covering 67 to form a single or integral structure 68 to further provide strength and stability to the extension pad 60. The vinyl covering 67 is preferably a PVC vinyl coated polyester having a weight of about 22 to 50 ounces per square yard. The cover 67 has flap portion that extends to cover and hide the backing 45 when installed. A vent is located on the bottom of the wrapped compression seal 50 and extension pad 60 structure 68 as shown in FIG. 7.

The third flexible component or inward extending wiping pad 70 spans the height 12 of the dock opening 10, and is secured to the outer end 61 of the extension pad 60 along that distance. The pad 70 has a length defined by its inner and outer ends 71 and 72 of about sixteen inches. The wipe seal pad 70 length extends inwardly into the bay opening projection 15 about the same amount as the compression seal pad 50, or about four inches into the bay opening projection as shown in FIGS. 2B and 4C. The inner and outer surfaces 73 and 74 of the pad 70 define its thickness, which is about two inches. The flexible wipe pad 70 extends inwardly toward the door opening projection 15 and is in registered alignment with the compression pad 50.

The pad 70 has an interior 75 that is preferably made of the same type of open cell polyurethane foam as the extension pad 60, and has a density of about 2 lbs/cubic foot, an ILD of about 90-110 lbs/50 sq·in, a tensile strength of about 12 lbs/foot, a tear strength of about 1.2 lbs/in., and memory to resiliently return to its original shape when the trailer pulls away and the foam is not compressed or flexed. The wipe pad 70 is wrapped in a durable vinyl covering 77. This covering 52 has securement flaps 78 to firmly join the wipe seal pad 70 to the front or outer end 61 of extension pad 60, such as via Velcro or other suitable form of securement. The bottom end 42 of each side seal assembly 40 has a flexible securement strip or sheet 79. The sheet or stabilizing piece 79 allows the wipe seal pad 70 to bend inwardly when engaging the side 22 of a trailer 20. The strip 79 prevents the wind from blowing the wipe pads 70 outwardly. The sheet 79 also closes off a gap between the pads 50, 60 and 70 that would otherwise allow air to leak by the side seal assemblies 40.

When the pads 50, 60 and 70 are in their non-flexed and non-compressed conditions (FIG. 4C), the inner and outer surfaces 73 and 74 of the flexible pad 70 are in generally parallel registered alignment with the front surface 51 of the compression pad 50. When the pads 50, 60 and 70 are in this non-flexed and non-compressed condition, the surfaces 51, 63 and 73 of pads define an open area or space between surfaces 73 and 51 that has a generally square shape. When engaging the sides 22 of a trailer 20 to form a wipe seal 100 (FIGS. 4A-B), the flexible pad 70 is bent rearwardly toward the building wall 7 with its inner end 71 coming close to but not touching the front surface 51 of the compression pad 50.

The thickness of the compression pads 50 and the length of the extension and wipe seal pad 60 and 70 can be adjusted for various loading dock installations. For example, the length of the wipe seal pad 70 can be adjusted to extend into the door opening projection 15 more than the compression seal pad 50 extends into the opening projection as shown in FIG. 2C. Thus, the side seal assemblies 40 can adjust the width of the compression pads 50 and length of the extension and wipe pads 60 and 70 to adjust the engagement areas or zones (CSA and WSA) to meet the needs of a particular loading dock facility 3 or even a particular loading bay 5.

As best shown in FIGS. 5A-C and 8, the top seal assembly 80 has a ridged backing plate 82, compression type foam pads 84 and 90, and a hanging flap or curtain 98. The backing or mounting plate 82 is bolted or otherwise rigidly secured to the outer walls 7 of the building 3. The mounting plate 82 is similar to plate 45, and is about two inches thick, about twelve inches wide and spans the top width 13 of the loading bay opening 10. The plate 82 is preferably wood, seal or rigid plastic that is robustly designed to prevent warping, cracking or other deformation during use. The plate 82 is installed with its lower edge offset a uniform distance of about one inch from the top edge 13 of the bay opening 10.

The first flexible component or compression pad 84 spans the top width 13 of the bay opening 10, and is glued or otherwise firmly secured to the backing plate 82 along that distance. The compression pad 84 has a generally square cross-sectional shape as show in FIGS. 5A-C and 8. The surfaces 85-88 of the pad 84 define its thickness and width of about eight inches. The pad 84 does not extend into the bay opening 10. The compression seal pad 84 has an interior 89 that is preferably formed from an open cell polyurethane foam with a density of about 1.2 pounds per cubic foot and an ILD of about 28-36 lbs/50 sq·in, a tensile strength of about 12 lbs/foot, a tear strength of about 1.2 lbs/in., and memory to resiliently return to its original shape when the trailer 20 pulls away and the foam is not compressed. A vent is located on the underside 88 of the compression pad 84.

The second flexible component or canopy pad 90 spans the width 13 of the door opening 10, and is glued to the mounting plate 82 along that distance. The pad 90 is positioned radially outward or upward from the compression seal 90 relative to the door opening. The lower surface of the canopy pad 90 is in abutting engagement with the upper surface 87 of the top compression pad 84, and the pads and are glued together to provide support for the canopy pad 90. The canopy pad 90 has a substantially triangular cross-sectional as shown in FIGS. 5A-C and 8. The pad 90 has a width of about four inches at its base or rear end 91, and a width of about one inch at its front or outer end 92. The canopy pad 90 extends forward from the wall 7 a distance of about 2 feet. The pad 90 has an interior 95 that is formed from a compression type foam that is preferably an open cell polyurethane foam with a density of about 2 lbs/cubic foot, an ILD of about 90-110 lbs/50 sq, in, a tensile strength of about 12 lbs/foot, a tear strength of about 1.2 lbs/in., and memory to resiliently return to its original shape when the trailer pulls away and the foam is not compressed or flexed. The compression and canopy pads 84 and 90 are wrapped in a durable vinyl covering 97 to form an integral structure. The vinyl covering 97 is preferably a PVC vinyl coated polyester having a weight of about 22 to 50 ounces per square yard. The covering 97 has a flap that extends to hide the backing plate 82 when installed.

The downwardly extending flap or curtain 98 is secured to and hangs from the outer end 92 of the forward extending canopy pad 84. The upper end of the flap 98 is preferably joined to the outer end 92 of the canopy pad 90 via Velcro or other suitable form of securement. The flap 98 is made of a durable vinyl. The flap 98 has a height of about twelve inches and a lower end 98a and extends about four inches into the bay opening projection 15. A stiffening sheet 99 is attached to the flap 70 to ensure a proper seal with the top of the trailer during use.

As state above, the side seal assemblies 40 of the multi-seal dock seal 30 are suited for use with a conventional rigid header frame 19 as shown in FIG. 9. In this embodiment, the top seal assembly 80 is replaced by a conventional header frame 19 with a downwardly hanging front curtain, such as a header with a wood framed construction.

When installed, the multi-seal dock seal 30 extends along the two vertical sides 12 of the bay opening 10, and preferably around the sides 12 and horizontal top 13 of the opening 10 as shown in FIGS. 1A-B. During use, both a continuous wipe seal 100 and a continuous compression seal 105 are formed with the trailer 20 to produce a continuous multi-seal 110 along the sides 22 of the trailer, and preferably around the sides 22 and roof 24 of the trailer as shown in FIGS. 3, 4A-B and 5A-B. When the trailer 20 partially backs into the dock as in FIGS. 4B and 5B, the single-seal or wipe seal 100 is formed by the flex pads 70 and flap 98. The flex pads 70 flexingly engage and seal against the side walls 22 of the trailer, to form a continuous wipe seal 100 along the side walls of the trailer, and when used with the top wipe seal flap 98, combine to flexingly engage and seal around the sides walls 22 and roof 24 of the trailer to form a continuous wipe seal 100 around the sides and roof of the trailer. The flex pads 70 and flap 98 bend rearwardly to wipe along the sides and top walls 22 and 24 of the trailer. The higher density foam of the flexible wipe seal pads 70 and their extension pads 60 provide sufficient rigidity during their wiping action to from a continuous wipe seal 100 along the side walls 22 of the trailer 20, and when used in conjunction with a canopy curtain, around the sides and roof 22 and 24 of the truck or trailer.

Figure 4A:
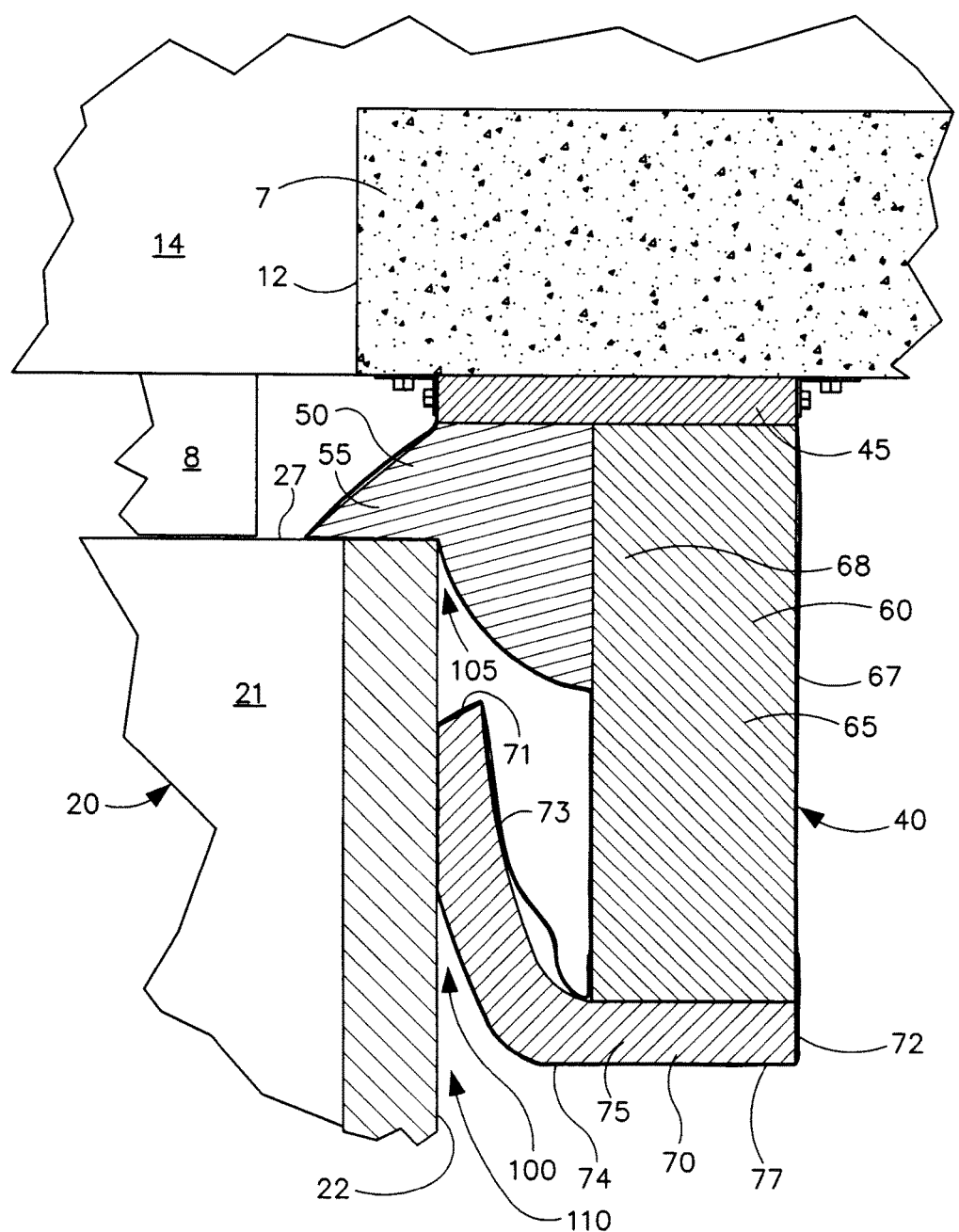
FIG. 4A is a cross-sectional view taken along line 4A-4A of FIG. 3 showing the trailer fully entered in the dock bay, the side wipe seal pad flexingly and sealingly engaging and forming a wipe seal 100 with the outer surface of the side wall of the trailer and the side compression seal pad compresingly and sealingly engaging and forming a compression seal 105 with the rear end of the side wall of the trailer to form a multi-seal 110 between the trailer side wall and loading dock.
Figure 4B:
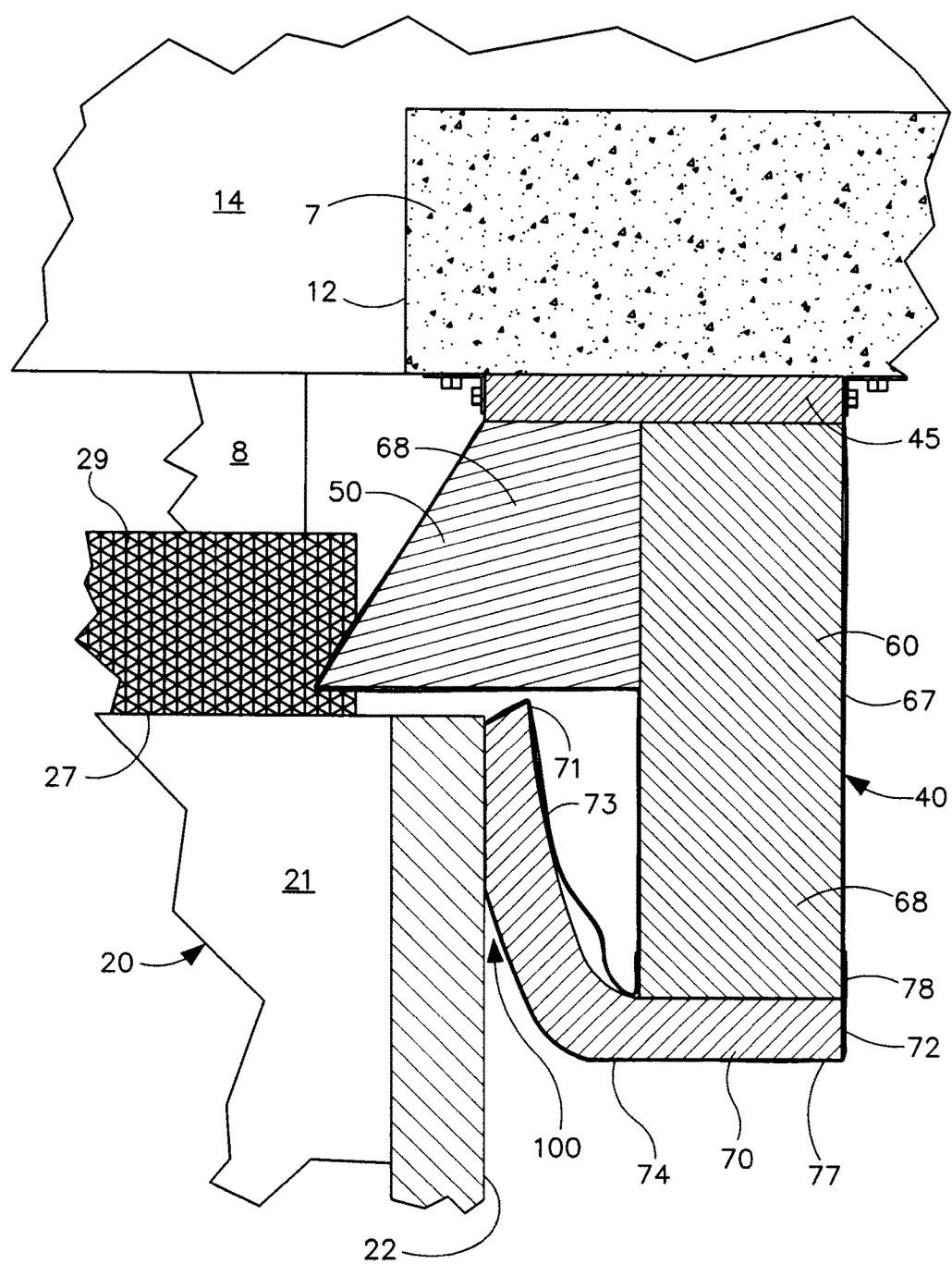
FIG. 4B is a cross-sectional view taken along line 4A-4A of FIG. 3 showing the trailer partially entered in the dock bay due to a trailer step platform preventing compressed engagement with the side compression seal pad, and showing the side wipe seal pad flexingly and sealingly engaging and forming a wipe seal 100 with the outer surface of the side wall of the trailer to form a single seal between the trailer wall and loading dock.
Figure 4C:
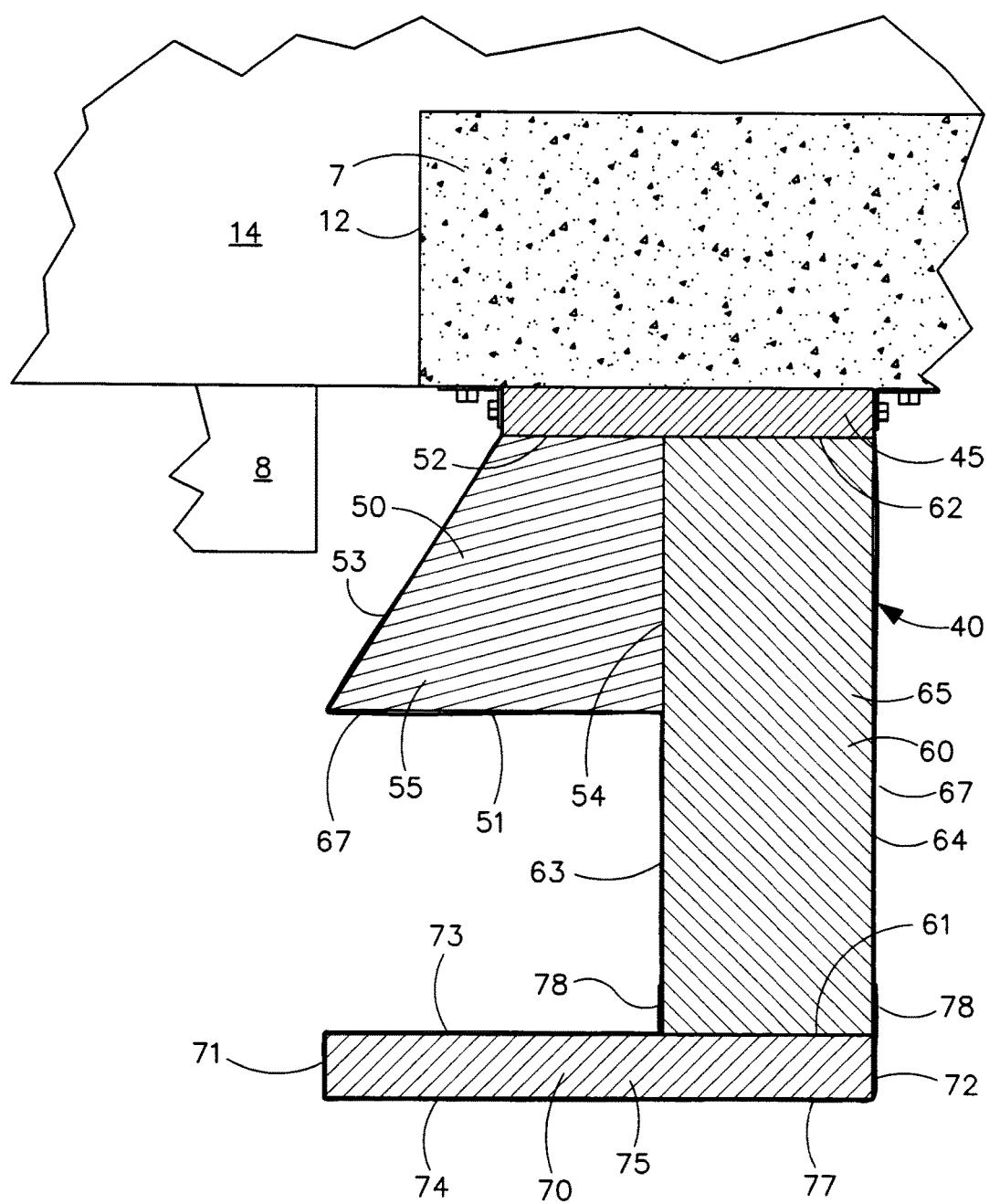
FIG. 4C is a cross-sectional view taken along line 4C-4C of FIG. 1B showing the side seal assembly in a normal non-engaged position when no trailer is parked in the loading dock bay.
Figure 5A:
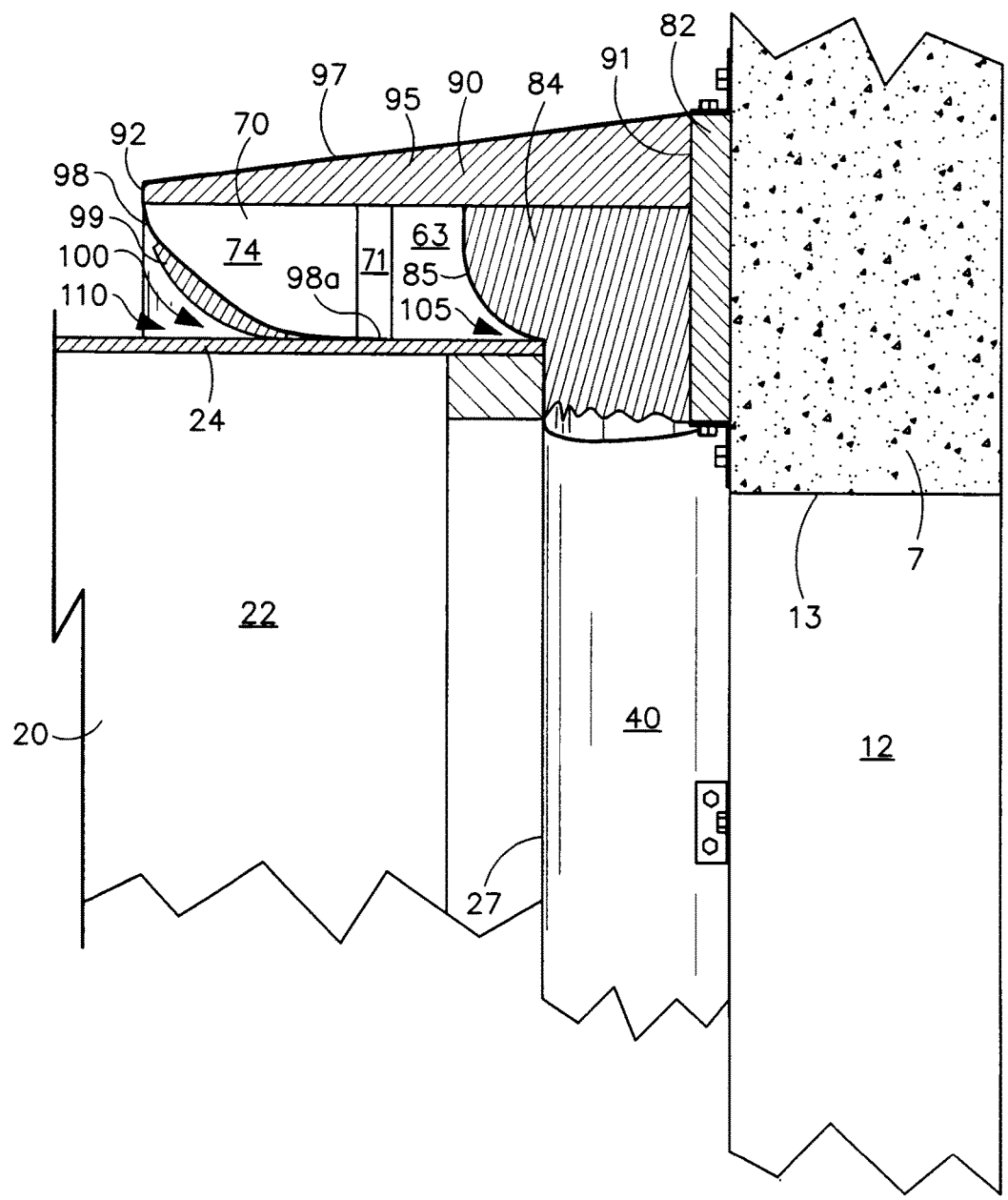
FIG. 5A is a side-sectional view taken along line 5A-5A of FIG. 3 showing the trailer fully entered in the dock bay, the top wipe seal pad flexingly and sealingly engaging and forming a wipe seal 100 with the outer surface of the trailer roof and the top compression seal pad compresingly and sealingly engaging and forming a compression seal 105 with the rear end of the trailer roof to form a multi-seal 110 between the trailer roof the loading dock.

When the trailer 20 backs further into the dock as in FIGS. 4A and 5A, the rear end 27 of the side walls 22 and roof 24 of the trailer compressibly engages and seals against pads 50 to form continuous compression seals 105 along the rear end 27 of the sides 22 of the trailer, and when used with top compression pad 84 combine to form a continuous compression seal around the rear end 27 of the sides and top 22 and 24 of the trailer. The formation of the continuous wipe and compression seals 100 and 105 produces a continuous multi-seal 110 along the trailer side walls 22, and around the trailer side walls and roof. However, should the trailer 20 fail to back completely into the dock as in FIGS. 4B and 5B so that the compression seal 105 is not fully engaged or formed, then the multi-seal 30 still provides a continuous wipe seal 100 around the perimeter of the trailer to seal the loading bay opening 10 from weather and the environment. Similarly, should the trailer 20 fail to completely engage the wipe seal pads 70 and flap 98 to form a continuous wipe seal 100, then the multi-seal 30 can still provides a continuous compression seal 105 along the side walls 22, and preferably around the rear end 27 of the trailer 20 to seal the bay opening 10 from weather and the environment.

Figure 5B:
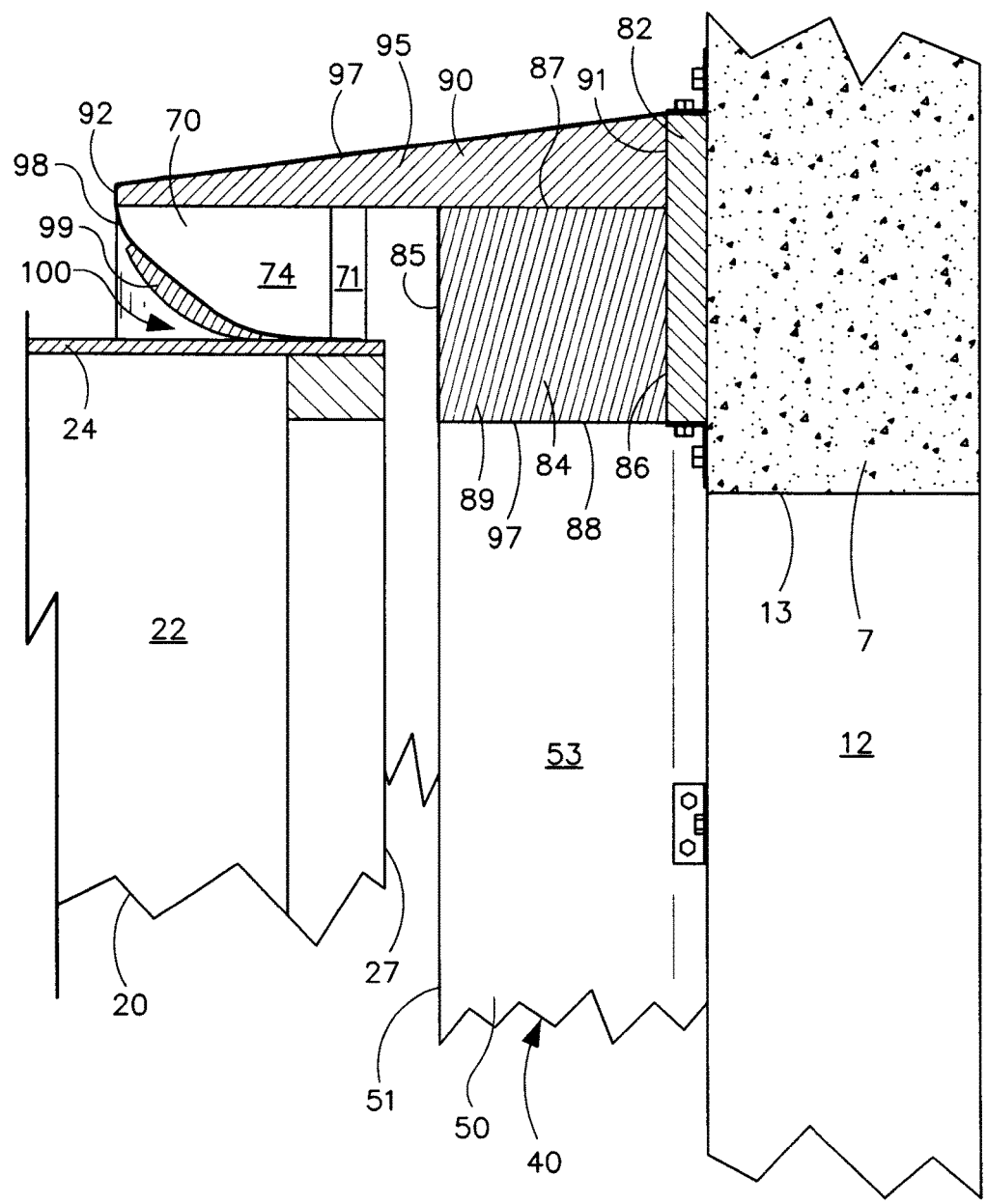
FIG. 5B is a side-sectional view taken along line 5B-5B of FIG. 3 showing the trailer partially entered in the dock bay so that the trailer roof does not engage the top compression seal, and showing the top wipe flap flexingly and sealingly engaging and forming a wipe seal 100 with the outer surface of the trailer roof to form a single seal between the trailer roof and loading dock.
Figure 5C:
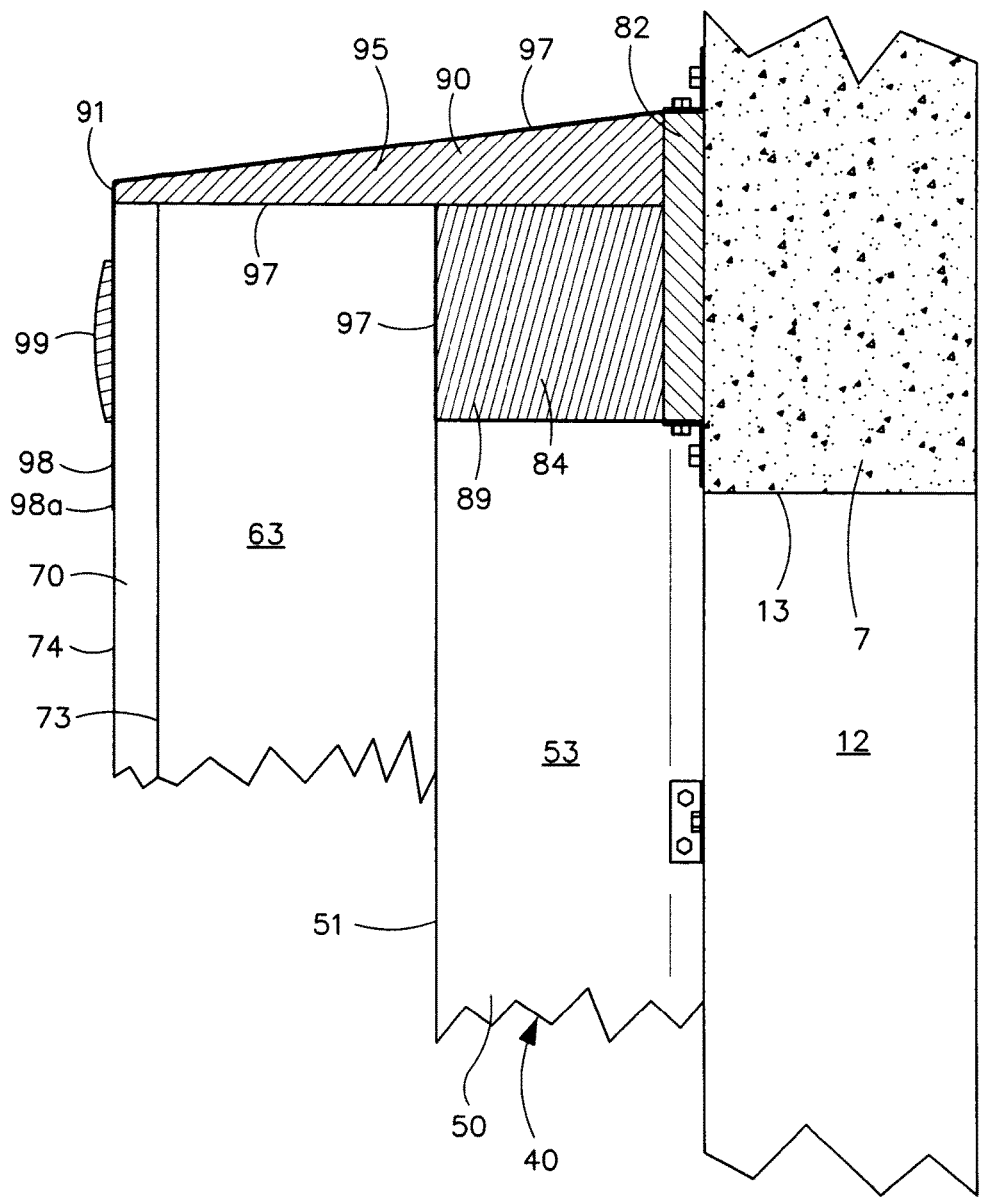
FIG. 5C is a cross-sectional view taken along line 5C-5C of FIG. 1B showing the top seal assembly in a normal non-engaged position when no trailer is parked in the loading dock bay.

As shown in FIGS. 5A-C, the side wipe seal pad 70 has an inwardly extending length that is sufficiently long to extend into the door opening 10 the same distance as the side compression pad 50. (FIG. 5C). The lengths of the side wipe seal pad 70 and side extension pad 60 are sized so that the side wipe seal pad 70 does not contact the front surface 51 of the side compression seal pad 50 when it is pushed back by the trailer 20. (FIGS. 5A-B). Each side wipe seal pad 70 is positioned forward from its respective compression pad 50 just far enough to prevent it from contacting the compression pad when in wiping engagement with the trailer 20. This prevents the side wipe pad 70 from being pinched between the rear end 27 of the trailer 20 and its respective compression pad 50. To avoid unnecessary wind and snow loads, the lengths of the extension pad 60 and canopy pad 90 are kept to a minimum to achieve desired wipe pad 70 and top flap 98 lengths.

While this invention is susceptible to embodiments in many different forms, the drawings show and the specification describes preferred embodiments of the invention. It should be understood that the drawings and specification are to be considered an exemplification of the principles of the invention. They are not intended to limit the broad aspects of the invention to the embodiments illustrated. Various changes may be made and equivalents may be substituted without departing from the broader aspects of the invention.

I claim:

1. A multi-seal dock seal for a loading dock to form a weather seal along side walls of a trailer when the trailer is parked in a trailer bay of the loading dock, the loading dock having a substantially planar wall with an outside surface and a door opening, the door opening having a predetermined height defined by bottom and top ends, and a predetermined width defined by opposed sides, the trailer side walls having a rear end, and the trailer having a rearmost portion, the rearmost portion allowing at least one of full entry and partial entry of the trailer into the trailer bay, said multi-seal dock seal comprising:

a pair of side seal assemblies adapted for securement to a building wall along the sides of the door opening and spanning at least the height of the door opening, each side seal assembly having a side compression pad spanning the height of the door opening and a rearwardly extending flexible side wipe pad spanning the height of the door opening, each said side compression pad having a predetermined thickness and a front surface positioned outwardly from the building wall, and each said side wipe pad being positioned forward of said front surface of a respective said side compression pad and in spaced registered alignment with said front surface of said respective side compression pad;

a top seal assembly adapted for securement to the building wall along the top end of the door opening, said top seal assembly including a top compression pad extending outwardly from the building wall and having a predetermined thickness and a front surface;

wherein each said side seal assembly and said top seal assembly includes an extension pad, each said extension pad being positioned radially outward of a corresponding side or top compression pad relative to the door opening, and wherein said extension pad of each said side seal assembly has a length sufficient to position said side wipe pad forward of the corresponding side compression pad to avoid contacting said side compression pad when forming a wipe seal with the trailer;

wherein each said side seal assembly forms a continuous single-seal with a respective side of the partially entered trailer and said side wipe pads flexingly and sealingly engaging side wall surfaces of the partially entered trailer to form the wipe seal with the partially entered trailer; and wherein each said side seal assembly forms a continuous multi-seal with the respective side of the fully entered trailer and said side compression pads compressably and sealingly engaging the rear end of the respective side of the fully entered trailer to form a compression seal with the fully entered trailer, and said side wipe pads flexingly and sealingly engaging the side wall surfaces of the fully entered trailer to form the wipe seal with the fully entered trailer.

2. The multi-seal dock seal of claim 1, and wherein said front surfaces of said side compression pads and said front surfaces of said side and top compression pads are in substantially planar alignment.

3. The multi-seal dock seal of claim 1, and wherein each of said side wipe pads are sized to prevent engagement with said front surface of said respective compression pad when engaged by the side wall of the trailer.

4. The multi-seal dock seal of claim 1, and wherein said side seal assemblies are adapted to cooperatively engage a conventional rigid header frame.

5. The multi-seal dock seal of claim 1, and wherein said front surfaces of said compression pads have a predetermined width, and the side wipe pads extend inwardly a distance equal to said predetermined width of said side compression pads.

6. The multi-seal dock seal of claim 5, and wherein the top end, bottom end and opposed sides of the door opening define a door opening projection extending into the trailer bay, and wherein said side compression pads and side wipe pads extend into the door opening projection.

7. The multi-seal dock seal of claim 5, and wherein said wipe pads extend inwardly more than said predetermined width of said side compression pads.

8. The multi-seal dock seal of claim 5, and wherein said side compression pads have a trapezoidal cross-sectional shape formed by said front surface, a rear surface and opposed side surfaces, said front surface being wider than said rear surface, and an entirety of said rear surface being located entirely outside the door opening projection.

9. The multi-seal dock seal of claim 1, and wherein the top seal assembly further includes a downwardly hanging top wipe seal positioned forward of said front surface of said top compression pad and in spaced registered alignment with said front surface of said top compression pad, and said extension pad of said top seal assembly has a length sufficient to position said top wipe seal forward of the corresponding top compression pad when forming the wipe seal with the trailer.

10. The multi-seal dock seal of claim 9, and wherein said top wipe seal is a curtain flap.

11. The multi-seal dock seal of claim 9, and further comprising a ridged backing member adapted to be firmly secured to the building wall, and said compression and extension pads having inner ends fixed to said backing member.

12. The multi-seal dock seal of claim 9, and wherein said top compression pad of said top seal assembly spans the door width and abuts each of said side compression pads, and said top wipe seal spans the door width and overlaps said side wipe pads.

13. The multi-seal dock seal of claim 9, and wherein said side wipe pads and said top wipe seal are in substantially planar alignment.

14. The multi-seal dock seal of claim 9, and wherein said side seal assemblies have a bottom stabilizing piece flexibly joining each said wipe pad to said extension pad.

15. The multi-seal dock seal of claim 9, and wherein said compression pads, wipe pads and extension pads are formed of an open cell polyurethane foam.

16. The multi-seal dock seal of claim 15, and wherein said wipe and extension pads are more rigid than said compression pads.

17. The multi-seal dock seal of claim 16, and wherein said compression pads have a density of about 1.2 pounds per cubic foot and an ILD of about 28-36 lbs/50 sq·in, a tensile strength of about 12 lbs/foot, a tear strength of about 1.2 lbs/in., and memory to resiliently return to an original shape.

18. The multi-seal dock seal of claim 17, and wherein said wipe and extension pads have a density of about 2 lbs/cubic foot, an ILD of about 90-110 lbs/50 sq·in, a tensile strength of about 12 lbs/foot, a tear strength of about 1.2 lbs/in., and memory to resiliently return to the original shape when the trailer pulls away.

19. The multi-seal dock seal of claim 15, and wherein said compression pads, extension pads and wipe pads are wrapped by a flexible vinyl covering.

20. The multi-seal dock seal of claim 19, and wherein said compression pad and extension pad of each said side seal assembly are in abutting alignment, glued together and wrapped by a single flexible covering to form a single structure.

21. The multi-seal dock seal of claim 19, and wherein said flexible covering is made of a PVC vinyl coated polyester having a weight of about 22 to 50 ounces per square yard.

* * * * *